United States Patent [19]

Niebauer

[11] Patent Number: 5,082,401
[45] Date of Patent: Jan. 21, 1992

[54] CUTTING INSERT FOR LIGHT FEED RATE
[75] Inventor: Kenneth L. Niebauer, Raleigh, N.C.
[73] Assignee: Kennametal Inc., Latrobe, Pa.
[21] Appl. No.: 629,736
[22] Filed: Dec. 18, 1990
[51] Int. Cl.$^5$ .............................................. B23B 27/22
[52] U.S. Cl. ................................... 407/114; 407/116
[58] Field of Search ......................... 407/113, 114–116

[56] References Cited

U.S. PATENT DOCUMENTS

| | | | |
|---|---|---|---|
| D. 305,662 | 1/1990 | Niebauer | D15/139 |
| D. 305,663 | 1/1990 | Niebauer | D15/139 |
| 3,733,664 | 5/1973 | McKelvey | 29/95 |
| 4,344,725 | 8/1982 | Seidel | 407/114 |
| 4,411,565 | 10/1983 | Hazra et al. | 407/114 |
| 4,685,844 | 8/1987 | McCreery et al. | 407/114 |
| 4,854,784 | 8/1989 | Murray et al. | 407/114 |

FOREIGN PATENT DOCUMENTS 0374800  6/1990  European Pat. Off. .

OTHER PUBLICATIONS

Kennametal, Kennametal/85 Catalog, p. 19, Pub. No. A84-18(140)J4.

Primary Examiner—Steven C. Bishop
Attorney, Agent, or Firm—James G. Porcelli

[57] ABSTRACT

A cutting insert having a generally polygonal insert body having a top face, a bottom face and a plurality of side walls extending therebetween. The juncture of each side wall with the top face defines a peripheral cutting edge. A chip breaking groove is formed in the top face and extends alongside the cutting edges. The chip breaking groove includes a descending wall which inclines downwardly from the cutting edges and a back wall which inclines upwardly from the rearward edge of the outside wall. The back wall includes a nose portion adjacent the cutting corner of the insert. The nose portion includes a tip and a pair of side edges which are disposed at an angle relative to the adjacent cutting edges of the insert body such that the width of the chip groove increases as it extends away from the cutting corner. A pair of shoulders are disposed on opposite sides of the nose portion and are disposed at an angle relative to the cutting edges of the insert body such that the width of the chip groove decreases as it extends from the cutting corner. In a preferred embodiment, the angle of inclination of the back wall relative to the top surface of the insert body increases as the back wall extends away from the cutting corner.

10 Claims, 5 Drawing Sheets

CUTTING INSERT FOR LIGHT FEED RATE

BACKGROUND OF THE INVENTION

The present invention relates generally to a cutting tool for metalworking operations and more particularly to a cutting insert for light feed rates having a chip breaking structure for breaking the chip removed from the workpiece into small pieces.

In metalcutting operations, the relative motion between the tool and workpiece produces a force called the shear deformation which forms a chip. The chip passes over the rake face of the cutting tool and receives additional deformation as a result of the sliding contact between the chip and the tool.

There are two principal classes of chips. Some alloys tend to produce a continuous, helical-shaped chip. This type of chip is most often encountered in machining tough metals with a low carbon content. A second type of chip is the discontinuous or broken chip. In machining more brittle metals, the chip tends to break or fragment into small pieces.

Generally speaking, it is desirable to break chips into small pieces rather than permit them to form into continuous chips. Broken chips are more easily cleared away by the cutting fluid; are more easily handled and stored; and do not tangle. Broken chips also produce less heat during the cutting operation than do continuous chips. Thus, it is easier to cool the tool and workpiece and tool life is increased.

For more ductile metals, it is often necessary to provide a chipbreaker on the face of the cutting insert to break the chip into small pieces. The chipbreaker usually comprises an obstruction in the path of the chip for deflecting and curling the chip. By bending the chip to the limit of its ductility, the chip breaks into small pieces.

The efficiency of the chipbreaker is affected by the design of the cutting tool. A chipbreaker that is placed too far or too close to the cutting edge will permit chips of more ductile metals to flow over the intended obstruction without breaking. Additionally, placing the chipbreaker too close to the cutting edge could cause the chip to crowd between the tool and workpiece, which could mar the finished surface and reduce tool life.

The optimum width and depth of the chipbreaker is governed by the rate of feed and depth of cut. Cutting tools are usually designed to operate within specific ranges for these two parameters. Further, these two parameters are not entirely independent. The feed rate for which a cutting tool is designed will affect the depth of cut it is capable of making. It is generally desirable to obtain as wide a range as possible in the depth of cut for a specified feed rate. By increasing the depth of cut relative to the feed rate, the cutting tool is more versatile and therefore increases productivity since it does not have to be changed as often to perform different metalcutting operations.

SUMMARY AND OBJECTS OF THE INVENTION

The invention provides an indexable cutting insert for light feed rates which can be used over a wide range in depth of cut relative to the feed rate. The improved cutting insert comprises a polygonal insert body having a top surface, a bottom surface and peripheral side surfaces. The edges between the peripheral side surfaces and the top surface are used for cutting. Rounded corners are formed where adjacent sides meet. In triangular or square shaped inserts, all of the corners may be used for cutting. In diamond shaped inserts, only two opposing corners are used for cutting.

A continuous, chip-breaking groove is formed about the periphery of the top surface for deflecting and bending the chip removed from the workpiece. The groove includes a descending wall which inclines downwardly from the cutting edges of the insert. A back wall extends upwardly from the rearward edge of the descending wall and terminates at the top surface.

The back wall is uniquely configured to provide improved chip control. More particularly, the back wall extends generally parallel to the cutting edge in the intermediate regions between the corners of the insert. In the corner regions of the insert, the back wall forms into a projecting nose section. The back wall includes a concave recess between the nose section and the intermediate section on both sides of the nose section. The distance between the cutting edge and the back wall in the recessed region is greater than the distance between the cutting edge and the back wall at the tip of the nose section. The recessed regions on opposite sides of the nose section allow for heavier depths of cut relative to the feed rate than with prior art inserts. Further, the geometry of the insert helps curl the chip back into the transitory shoulder of the workpiece where it cannot damage the finished surface.

Accordingly, it is an object of the present invention to provide an insert which can be used over a wide range of depth of cut relative to the feed rate.

It is another object of the invention to provide an improved chip control insert for deflecting the chip from the finished area of the workpiece.

Another object of the present invention is to provide an improved chip control insert for finishing operations.

Other objects and advantages of the present invention will become apparent and obvious from a study of the following description and the accompanying drawings which are merely illustrative of such invention.

DETAILED DESCRIPTION OF THE INVENTION

Figure 1:
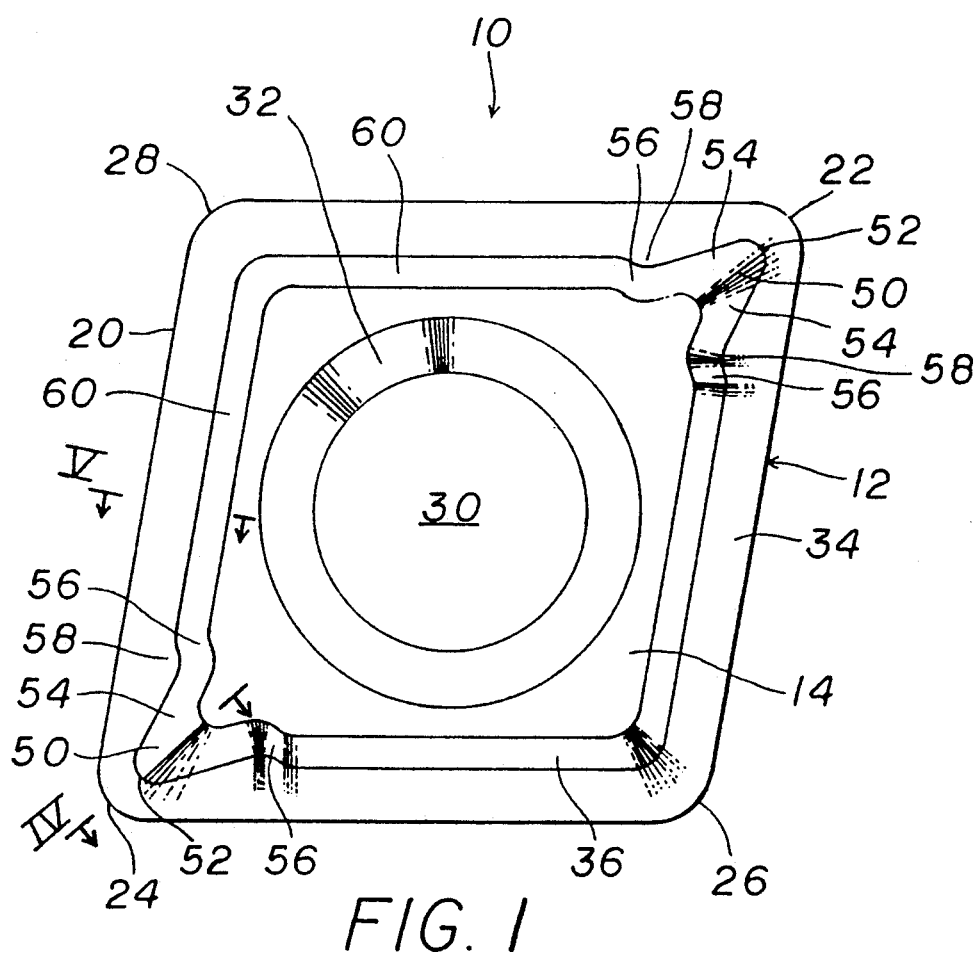
FIG. 1 is a top plan view of the cutting insert according to the present invention.
Figure 2:
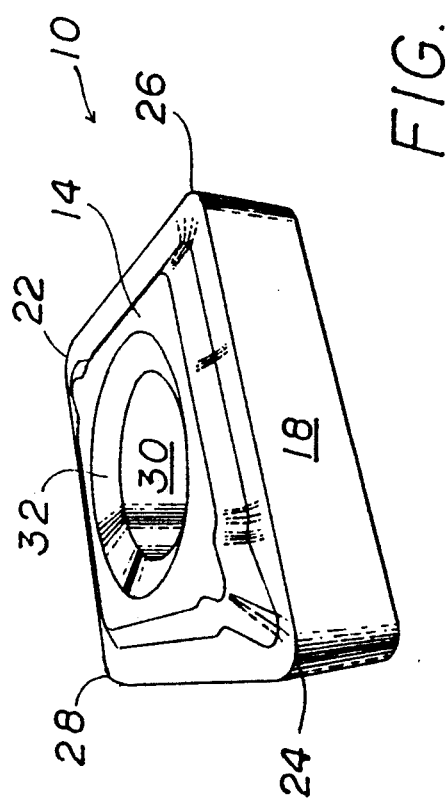
FIG. 2 is a perspective view of the cutting insert.
Figure 3:
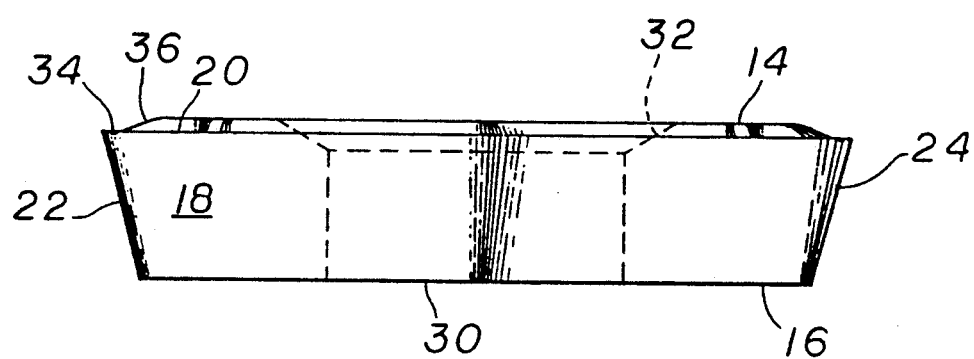
FIG. 3 is an elevational view of the insert shown in FIGS. 1 and 2.

The improved cutting insert is shown in FIG. 1 and generally indicated by the numeral 10. The insert 10 comprises an insert body 12 with a polygonal configuration. The insert body 12 includes generally parallel top and bottom surfaces 14 and 16. In one preferred embodiment of the invention, the insert body includes four side surfaces 18. Cutting edges 20 are defined where the side surfaces 18 meet the top surface 14. In the preferred embodiment of the invention, the insert 10 is a positive rake insert.

Thus, the side surfaces 18 are inclined at an angle between 5 degrees and 15 degrees relative to the vertical plane.

The insert 10 shown in FIG. 1 has a generally diamond shaped configuration with four radiused corners 22, 24, 26 and 28. A first pair of corners 22 and 24 are disposed along the median line of the insert 10, while a second pair of corners 26 and 28 are disposed on opposite sides thereof. The angle between adjacent edges 20 meeting at the first corners 22 and 24 is about 75 degrees to about 85 degrees. The angle between adjacent edges 20 meeting at the second corners 26 and 28 is the supplement of the angle between adjacent edges 20 meeting at the first corners 22 and 24. Opposite sides 18 of the insert 10 are parallel.

The insert 10 is adapted to be mounted in a conventional toolholder. Generally speaking, the toolholder includes an insert seat for receiving the cutting insert 10. The cutting inset 10 includes an opening 30 which is formed in the center of the insert. The opening 30 includes a chamfer 32 adjacent the top surface 14. A screw (not shown) passes through the opening 30 in the insert 10 and screws into a threaded hole in the insert seat of the toolholder. The head of the screw butts against the chamfer 32 to hold the insert 10 firmly in the insert seat.

The insert 10 as shown in FIG. 1 is indexable so that both the first corners 22 and 24 can be used for cutting. The cutting insert is designed to perform at light feed rates in the range of 0.002 to 0.005 inches. The insert is capable of making depth of cuts in the range of 0.002 to 0.010 inches. At the lower end of the depth of cut range, only the tip of the insert 10 is cutting and a thin chip is generated. On the other hand, when cutting in the upper end of the depth of cut range, a slightly heavier chip is formed. Under either condition, it is necessary to break the chip into small pieces to prevent it from forming into a continuous, helical-shaped chip.

The present invention employs a continuous chip groove extending around the periphery of the top surface 14 for deflecting and bending the chip removed from the workpiece. The chip groove includes a descending wall 34 which inclines downwardly from the cutting edges 20 of the insert 10. The angle between the descending wall 34 and the plane of the top surface 14 is approximately 3 degrees. A back wall 36 extends upwardly from the rearward edge of the descending wall 34 and terminates in the plane of the top surface 14. The back wall 36 functions to deflect and curl the chip removed from the workpiece into the transitory shoulder region of the workpiece.

The back wall 36 of the insert 10 is uniquely configured to provide improved chip control through a wide range in depth of cut relative to the feed rate. The back wall includes a pair of nose sections 50 disposed adjacent the first corners 22 and 24. The tip 52 of the nose section 50 is spaced approximately 0.005 to 0.009 inches from the corner as measured along the median line which bisects the insert. The sides 54 of the nose section extend away from the tip 52 at an angle of approximately 27 degrees relative to the cutting edge 20. It will be readily apparent, therefore, that the distance between the cutting edges 20 of the insert and the back wall 36 increases as the back wall 36 extends away from the tip 52 of the nose section 50. A pair of shoulder sections 56 are disposed adjacent each nose section 50 on opposite sides thereof. The shoulder sections 56 are also disposed at an angle relative to the cutting edges. However, in contrast to the sides of the nose section 50, the shoulder sections 56 get closer to the cutting edge as the shoulder section extends away from the corners 22 and 24. A concave recess 58 is formed in the back wall 36 at the juncture of the nose section 50 with each shoulder section 56.

From each shoulder section 56 extends a flank section 60 which is parallel to the cutting edge 20. As seen in FIG. 1, each flank section 60 meets a flank section 60 at the second corners 26 and 28. In this embodiment, the second corners 26 and 28 are not being used for cutting.

Figure 5:
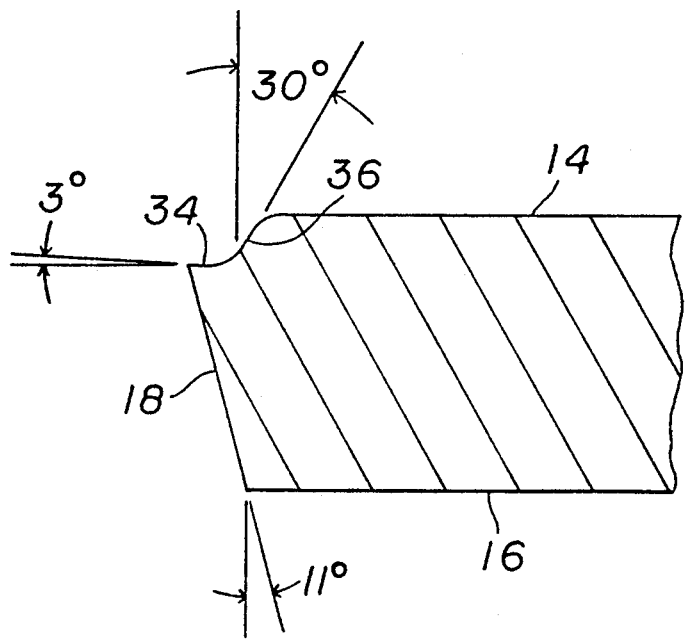
FIG. 5 is a partial section view taken along line V—V of FIG. 1.
Figure 4:
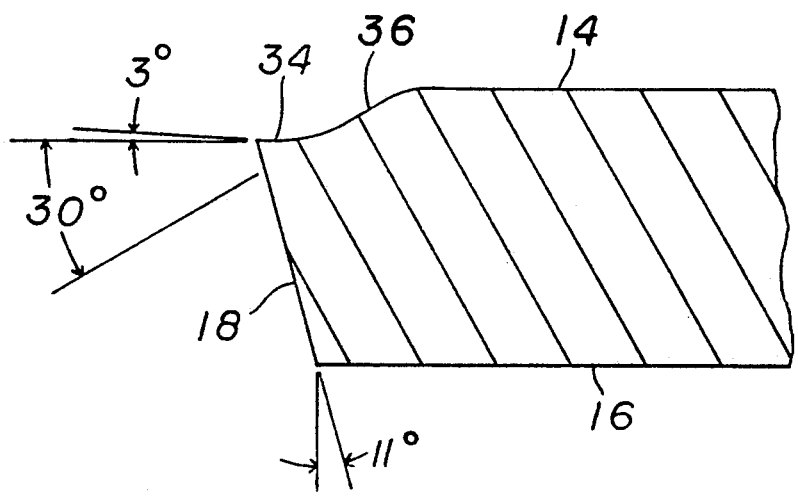
FIG. 4 is a partial section view taken along line IV—IV of FIG. 1.

In the preferred embodiment of the invention, the back wall 36 has an angle of inclination which varies as the back wall extends away from the tip 52 of the nose section 50. More particularly, the angle of inclination of the back wall 36 at the tip 52 of the nose section 50 is about 30 degrees relative to the top surface 14 (see FIG. 4). In the flank section 60, the angle of inclination of the back wall 48 is about 60 degrees relative to the top surface 14 (see FIG. 5). Between the tip 52 of the nose section 50 and the flank section 60, the back wall 48 gradually changes in angle.

It has been found that a metalcutting insert having the chip control feature as described herein provides significantly improved chip control over a wide range in depth of cut relative to the feed rate. Additionally, the cutting insert of the present invention tends to curl the chip removed from a workpiece back into the transitory shoulder region of the workpiece where it cannot damage the finished surface. The unique chip groove configuration achieves a significant reduction in the forces which the insert is subjected to during the cutting operation which results in lower operating temperature and longer tool life.

Figure 6:
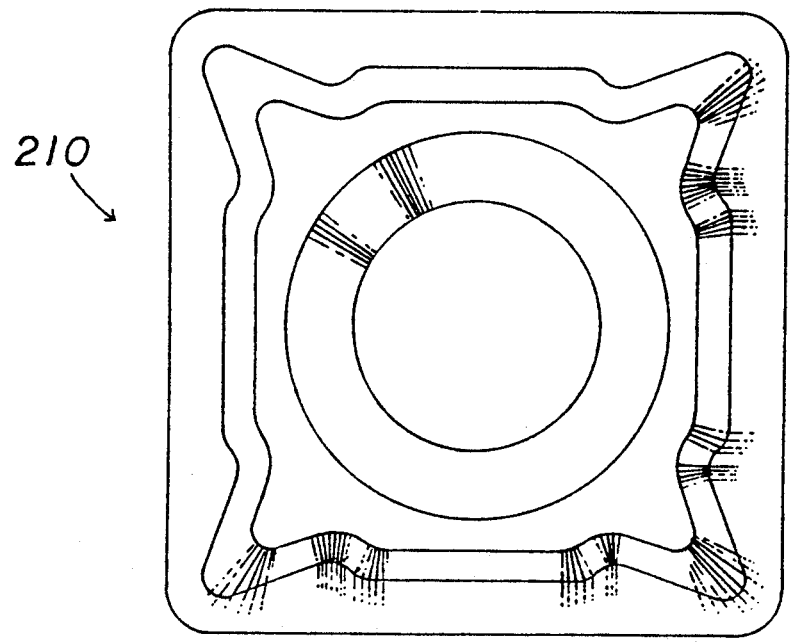
FIG. 6 is a plan view of a second embodiment of the invention.

Referring now to FIG. 6, a second embodiment of the present invention is shown therein. In the second embodiment of the invention, the insert 210 has a square configuration including four corners. In the second embodiment, all four corners of the insert 210 are used for cutting whereas only two corners were used for cutting in the first embodiment. Accordingly, the back wall forms a nose section adjacent all four corners of insert 210. In all other respects, the insert 210 has the same features as the insert 10. Therefore, those features will not be set forth again in detail, but reference is invited to the previous portions of the specification which describe insert 10.

Figure 7:
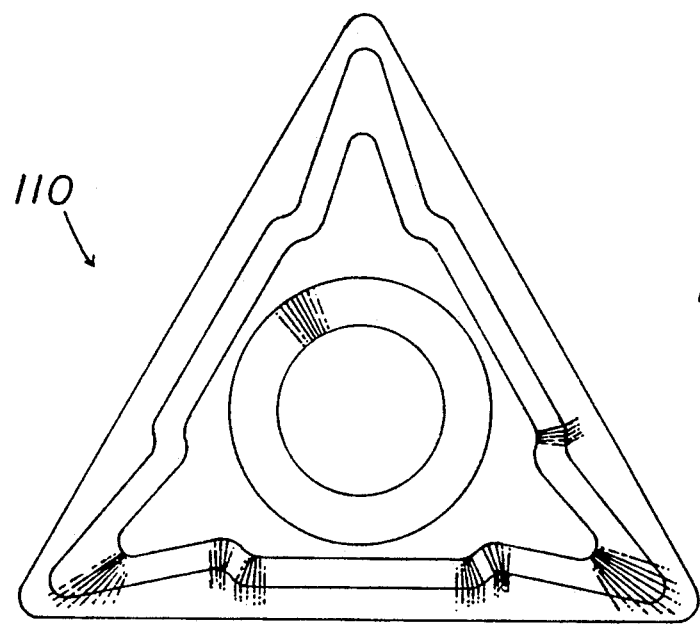
FIG. 7 is a plan view of a third embodiment of the invention.

In FIG. 7, a third embodiment of the present invention is shown. The insert 110 of the third embodiment has a generally triangular configuration with three corners. All three corners of the insert 110 are used for cutting. Accordingly, the back wall of the insert 110 forms a nose section adjacent each corner. In all other respects, insert 110 is the same as insert 10 and insert 210.

Other objects and advantages of the present invention will become apparent and obvious from a study of the following description and the accompanying drawings which are merely illustrative of such invention.

What is claimed is:

1. An indexable cutting insert comprising:
   (a) a generally polygonal insert body having a top face, a bottom face and a plurality of side walls extending therebetween with the juncture of each side wall and the top face defining a peripheral cutting edge, said polygonal insert body further including at least one radiused corner portion connecting two adjacent cutting edges, said corner portion and the adjacent area normally being engaged with the workpiece during a cutting operation in which a chip is removed from the workpiece; and (b) a chip-breaking groove formed in the top face of the insert body and extending alongside the cutting edges, said chip-breaking groove including a descending wall which inclines downwardly from the cutting edges to a rearward edge and a back wall which inclines upwardly from the rearward edge of the descending wall, said back wall including a nose portion adjacent the corner portions of the insert having a tip and a pair of side edges which are disposed at an angle relative to the adjacent cutting edges of the insert body such that the width of the chip groove increases as it extends away from its respective corner, and wherein the angle of inclination of the back wall relative to the top face of the insert body increases as the back wall extends away from its respective corner whereby said insert may be utilized in finishing operations through a wide range of depth of cut relative to the feed rate.

2. The cutting insert according to claim 1 wherein the back wall further includes a pair of shoulder portions disposed adjacent the nose section on opposite side thereof which are disposed at an angle relative to the cutting edges of the insert body such that the width of the chip groove decreases as it extends away from its respective corner, and wherein the juncture of the nose section with shoulder portions define a pair of concave recesses on opposite sides of the nose section.

3. The cutting insert according to claim 2 wherein the back wall further includes a pair of flank portions extending from the shoulder portions parallel to the cutting edges of the insert body.

4. The cutting insert according to claim 1 wherein the angle of inclination of the back wall along a line bisecting the nose section is between approximately 30 degrees and 60 degrees relative to the top face of the insert body.

5. The cutting insert according to claim 4 wherein the angle of inclination of the back wall along a line perpendicular to the cutting edge and intersecting the flank portion is between approximately 15 degrees and 45 degrees.

6. An indexable cutting insert comprising:
(a) a generally polygonal insert body having a top face, a bottom face, and a plurality of side walls extending therebetween with the juncture of each side wall and the top face defining a peripheral cutting edge, said polygonal insert body further including a plurality of radiused corner portions for engaging the workpiece during a cutting operation and removing a chip therefrom;

(b) a chip groove formed in the top face of the insert body and extending alongside the cutting edges, said chip groove including a descending wall which inclines downwardly from the cutting edges to a rearward edge and a back wall which inclines upwardly from the rearward edge of the descending wall, said back wall including at least one nose portion adjacent one of said corners of the insert body, said nose section including a tip and a pair of side walls which are disposed at an angle relative to the adjacent cutting edges of the insert body such that the width of the chip groove increases as it extends away from said corner, said back wall further including a pair of shoulder portions disposed adjacent to and on opposite sides of the nose section, said shoulder portions being disposed at an angle relative to the cutting edges of the insert body such that the width of the chip groove decreases as the back wall extends away from said corner, said back wall further including flank sections extending from said shoulder sections generally parallel to the cutting edges so that the width of the chip groove adjacent the flank sections remains relatively constant whereby said insert may be utilized in finishing operations through a wide range in depth cut relative to the feed rate.

7. The indexable cutting insert according to claim 6 wherein the polygonal insert body has a generally diamond-shaped configuration with two pairs of parallel cutting edges and four corners, and wherein said back wall of the chip groove forms two nose sections adjacent to opposing corners.

8. The cutting insert according to claim 6 wherein the polygonal insert body has a square shaped configuration, and wherein the back wall of the chip groove forms a nose section adjacent each of the four corners of the insert body, said nose sections being joined by four flank sections extending parallel to the four cutting edges between respective nose portions.

9. The indexable cutting insert according to claim 6 wherein the polygonal insert body has a generally triangular shaped configuration including three cutting edges and three corners, and wherein the back wall of the chip groove forms three nose sections adjacent each of the corners of the insert body, said nose sections being joined by flank sections extending parallel to the cutting edges between respective pairs of said nose sections.

10. The cutting insert according to claim 6 wherein the angle of inclination of the back wall at the tip of the nose section is approximately 30 degrees relative to the top face of the insert body, and wherein the angle of inclination of the back wall along the flank sections is approximately 50 degrees relative to the top face, and wherein the angle of inclination varies gradually between the tip of the nose section and the flank sections.

* * * * *